United States Patent [19]

Brown et al.

[11]  4,425,968

[45]  Jan. 17, 1984

[54] SELECTIVE WATER EXCLUSION

[75] Inventors: Alfred Brown, Houston; Wilbur L. Hall, Bellaire, both of Tex.

[73] Assignee: Texaco Inc., White Plains, N.Y.

[21] Appl. No.: 381,601

[22] Filed: May 24, 1982

[51] Int. Cl.³ .................... E21B 43/22; E21B 43/32
[52] U.S. Cl. ................................ 166/295; 166/273
[58] Field of Search ................ 166/273–275, 166/294, 295; 252/2.55 D

[56]  References Cited

U.S. PATENT DOCUMENTS

| | | | |
|---|---|---|---|
| 2,670,048 | 2/1954 | Menaul | 166/295 |
| 3,078,920 | 2/1963 | ten Brink | 166/33 |
| 3,557,873 | 1/1971 | Owens | 166/274 |
| 4,046,196 | 9/1977 | Brown et al. | 166/273 |
| 4,203,491 | 5/1980 | Reisberg | 166/274 |

FOREIGN PATENT DOCUMENTS 755995  8/1980  U.S.S.R. ........................... 166/295

*Primary Examiner*—Stephen J. Novosad
*Assistant Examiner*—William P. Neuder
*Attorney, Agent, or Firm*—Carl G. Ries; Jack H. Park; Harold J. Delhommer

[57]  ABSTRACT

A method is disclosed for selectively reducing the permeability of water producing intervals in a hydrocarbon formation without reducing oil permeability. A soluble oil followed by water is injected into the formation to lower the residual oil saturation. The well is then produced to remove water from any oil zones before injection of an isobutyl-methacrylate solution in acetone. A slug of a non-condensable gas follows the treating solution before the shutting in of the well for up to about one day.

11 Claims, No Drawings

SELECTIVE WATER EXCLUSION

FIELD OF THE INVENTION

This invention relates to the treatment of underground hydrocarbon formations to reduce water production. More particularly, this invention involves a method for selectively reducing the water permeability of a formation by several injection steps, one of which is the injection of a methacrylate polymer.

BACKGROUND OF THE INVENTION

Many hydrocarbon reservoirs are comprised of a plurality of strata. It is not unusual for a producing well to be in communication with one or more intervals or strata of the formation from which hydrocarbons are recovered and one or more intervals from which water is recovered. Channels that have a high permeability to water may also exist within each interval. Additionally, the use of steam flooding and water flooding techniques will usually increase the size and number of water producing channels within the formation. And since water is an unwanted fluid that must be disposed of, and in some cases may form emulsions with oil, it is desirable to reduce water production.

PRIOR ART

Numerous techniques have been discovered to reduce the permeability of water producing channels and intervals in a selective fashion without substantially reducing the flow of the desired hydrocarbons from the reservoir. One employed practice has been to inject liquid cement or adhesive into the formation and permit the cement to set, thereby rendering the formation substantially fluid impermeable. Another method under wide use has been to inject two different treating fluids in sequence, the fluids being selected on the basis that the components of one fluid will react with the components of the second fluid, resulting in cementation or the deposition of a precipitate into the flow channels of the formation, reducing permeability. A third solution has been to inject solid particles, such as clays, that swell upon addition of water.

Each of the above methods of plugging or reducing the permeability of an underground formation has disadvantages. Frequently, it is hard to inject viscous fluids such as liquid cement into relatively tight formations that are encountered in petroleum operations. Furthermore, it is most difficult to inject the formation plugging fluid into the specific water producing intervals without also injecting the plugging fluid into oil producing intervals. The permeability of the oil bearing zones may be reduced as much as the permeability of the water bearing zones, an unacceptable result.

The use of two reactant fluids to form a plug in situ also suffers from placement difficulties. Additionally, skin plugging effects due to reaction at the interface between the fluid handicaps their application. It has also been found that adequate mixing is difficult between two separately injected fluids so as to achieve substantial and complete reaction between the two different fluids.

Processes have also been developed for treating subterranean formations with hydrophilic polymers such as polyacrylamides or polysaccharides, particularly in combination with the injection of compounds which promote cross-linking between the polymer solutions previously injected and encourage the attachment of the polymers to the mineral surfaces of the reservoir. The chief disadvantage of these compounds are that they are not selective with respect to oil containing and water containing intervals, and are as likely to reduce the permeability of the oil producing strata as they are to reduce water permeability. Further, residual oil saturations of about 20% to 40%, which are commonly left after enhanced recovery operations, may prevent the firm setting of various plugging agents.

U.S. Pat. No. 3,078,920 discloses the injection of a 2% to 20% concentration of methyl methacrylate in a solution of a water miscible solvent such as acetic acid, propionic acid or a ketone to reduce water permeability. Unfortunately, this method fails to work adequately due to an inability of the methacrylate to harden satisfactorily and form more than a temporary plug. Whenever the residual oil saturation in the intervals near the well bore is greater than about 0.10 to about 0.20, the residual oil will prevent the methacrylate from hardening sufficiently, even in the water producing intervals.

Methylmethacrylates have also been employed for flooding purposes in a water miscible solvent such as acetic acid or a ketone. U.S. Pat. No. 4,046,196 employs solid polymerized methacrylates along with a water drive to increase oil recovery.

U.S. Pat. No. 3,557,873 discloses the use of a soluble oil to increase water permeability by reducing residual oil saturation in the area immediately surrounding the well.

SUMMARY OF THE INVENTION

The disclosed invention for treating hydrocarbon formations employs a multiple step sequence to reduce the permeability of water producing intervals without causing a significant reduction in permeability of oil producing intervals. Insolation of individual water producing intervals to the exclusion of oil producing strata is not required. The process itself is selective to water producing channels and strata.

The method is begun by injecting into the formation a soluble oil having the ability to emulsify when admixed with water. Water is injected after the soluble oil to drive the injected oil away from the well bore into the formation. The soluble oil and injected water lower the residual oil saturation around the well bore. The well is then produced for a time sufficient to remove any water which invaded oil producing zones of the reservoir. Fluids which collect in the well bore are then displaced by lifting to the surface and a treating solution of isobutyl-methacrylate in acetone is injected into the formation. A non-condensable gas is then injected after the treating solution to force the treating solution deeper into the formation. The well is then shut in for up to about twenty-four hours. When the well is placed back on production, water production is substantially less because of descreased permeability in water producing intervals.

DETAILED DESCRIPTION OF THE INVENTION

To effectively treat and control the problems of water injectivity and encroachment, high permeability water zones and channels should be plugged or have their permeability reduced to that of the less permeable zones which have higher oil saturations. Water production is frequently a problem in oil production, especially in reservoirs that have been subject to steam flooding or water flooding. Consequently, the present invention has been developed to reduce formation permeability to water in high permeability water zones of an underground reservoir.

The method is begun with the injection of a soluble oil into the formation for the purpose of reducing the residual oil saturation in the water zones of the reservoir for a distance of about five to about one hundred radial feed from the well bore. The soluble oil is injected in an amount less than about one barrel per vertical foot of formation, and preferably in an amount between about 0.1 to about 0.5 barrels of soluble oil per vertical foot of producing formation. A soluble oil as used herein is a composition possessing the ability to spontaneously emulsify when mixed with water. Such soluble oils generally comprise a liquid hydrocarbon and one or more selected surfactants. Small amounts of additional compounds such as an alcohol or a stabilizing agent may also be added to the soluble oil.

The soluble oil is followed by the injection of a quantity of water, preferably water from the formation. The formation water is injected to drive the soluble oil a sufficient distance from the well bore and to aid in emulsification of the soluble oil and residual oil in the formation. The combination of soluble oil and injected formation water is needed to lower the residual oil saturation in the water producing intervals to a very low residual oil saturation of about two to about five percent.

Unless residual oil saturation is reduced to a level below about ten to fifteen percent, the later injection of isobutyl-methacrylate will fail to substantially reduce formation permeability to water. Higher residual oil saturations cause banks of oil to be built up ahead of the injected isobutyl-methacrylate in acetone. Subsequently, when the well is brought back on production, the enhanced oil bank will flow into the treating solution of isobutyl-methacrylate, dilute it and prevent it from substantially retarding water flow.

After the residual oil saturation around the well is reduced by the injection of the soluble oil and water below about ten percent, preferably below about five percent, the well is placed back on production long enough to remove any water which invaded the oil producing zones. This step is necessary to prevent the setting up of the isobutyl-methacrylate treating solution within the oil producing zones. Production flow should continue until the water-oil ratio substantially approaches the ratio prior to beginning of well treatment. Any fluids within the well bore below the packer are then removed by bailing or gas lift with nitrogen or natural gas injection.

After the prior preparation steps are finished, the isobutyl-methacrylate treating solution is injected into the formation. It is preferred that the isobutyl-methacrylate concentration in acetone be about five percent to about thirty percent by weight. Less concentrated solutions under five percent by weight are useful, but will not produce permanent or substantial reductions in water permeability.

The injection of isobutyl-methacrylate treating solution is followed by the injection of a slug of non-condensable gas, such as nitrogen, carbon dioxide, helium or methane, followed by a slug of crude oil to displace the treating solution from the well bore and into the formation. If it is desired to set up the treating solution a greater radial distance into the formation from the well bore, larger slugs of non-condensable gas and crude oil must be injected to force the treating solution deeper into the formation. The hydrocarbon slugs which follow the treating solution insure that the treating solution will not be diluted until the desired formation penetration is achieved.

The well is then shut in for a period of approximately 6 to 30 hours, preferable 12 to 24 hours to allow for setting of the isobutyl-methacrylate within the water zones. Optionally, it may be desirable to produce a small quantity of fluids through the well tubing before shutting the well in to achieve a better set of the treating solution. Depending on the properties of the reservoir and the type of enhanced oil recovery being practiced in the formation, the practice of the invention will reduce the permeability of the water zones about 50 percent to about 95 percent.

The addition of water to the soluble oil employed in the invention forms an emulsion of the water-in-oil type in which water is dispersed in the oil in small droplets. Such emulsions are generally transparent and stable in that they remain as micro-emulsions upon aging. With high water concentrations above the inversion concentration, the emulsion is an oil-in-water emulsion in which the oil droplets are finely dispersed in the continuous water phase.

The soluble oil compositions employed in the invention are comprised of about 60 percent to about 90 percent by weight of a liquid hydrocarbon with an additional 1 percent by about 30 percent by weight of an oil soluble surfactant. The surfactant is selected to promote the formation of an emulsion upon contact with water. Optionally, the soluble oil may further contain about 1 percent to about 10 percent sodium rosinate by weight.

The liquid hydrocarbon utilized in the soluble oil composition can be any crude oil or a refined petroleum product such as gasoline or naphtha. Preferably, the liquid hydrocarbon will be of a relatively high boiling temperature hydrocarbon with the boiling point of above about 200° C. A wide variety of surfactants may be employed to form the soluble oil, provided that the selected surfactant substantially promotes emulsion formation. An especially preferred class of surfactants are anionic surfactants such as the alkyl aryl sulfonates.

Two preferred soluble oils are the compositions sold under the trademarks of "Texaco Soluble Oil C" ® and "Texaco Soluble Oil D" ® by Texaco Inc. for use as a general soluble oil and a cutting oil, respectively. "Texaco Soluble Oil C" ® is comprised of approximately 80% naphthenic distillate oil, 6% sodium petroleum sulfonate, 4% sodium rosinate and 10% miscellaneous ingredients. "Texaco Soluble Oil D" ® is comprised of approximately 81% naphthenic distillate oil, 8% sodium petroleum sulfonate, 5% sodium rosinate and 6% miscellaneous ingredients.

The following examples will further illustrate the selective permeability reduction method of the present invention. They are given by way of illustration and not as a limitation on the scope of the invention. Thus, it should be understood that reactants, quantities of reactants, time, temperatures and pressures of the process may be varied with much of the same results achieved.

EXAMPLE I

A glass horizontal flow cell and reservoirs for injected fluid were employed with a nitrogen gas drive. The flow cell was loosely filled with clean silica sand and then, applying constant pressure, saturated with brine. After brine saturation, the cell was flow saturated with a light oil sold under the trade name "Texaco 300 Oil" ® by Texaco, Inc. This is a light bodied mineral oil having an API gravity of 38.7° and viscosity of 4.3 centistokes at 40° C. The cell was then water flooded to a residual oil saturation of 11.5 percent. Water permeability in the coarse, loose sand pack was 12 darcies.

The cell was then flooded with a 20 percent by weight isobutyl-methacrylate in acetone solution, which was allowed to set. Water permeability was measured by injecting brine until the cell reached equilibrium. Approximately an 86 percent reduction in permeability to water was achieved by the reduction of water permeability to 1.7 darcies.

The flow cell was then torn apart to examine the character of the isobutyl-methacrylate plug. The plug was very elastic, forming a stringy network which stretched. The elasticity of the oil-softened methacrylate plug indicated that the plug was not of a permanent character.

It should also be noted that water permeability was extremely high and residual oil saturation was quite low because of two factors—a very loose sand pack and a pale oil without any heavy hydrocarbon fractions.

EXAMPLE II

The horizontal flow cell was set up in a similar manner as the cell of Example I. Water permeability was measured at 9.1 darcies with a residual oil saturation after water flooding of 14 percent. The cell was then flooded with a soluble oil sold under the trademark "Texaco Soluble Oil D" ®, followed by brine, which reduced water permeability to 1.7 darcies and residual oil saturation to 4 percent.

A 20 percent concentration by weight isobutyl-methacrylate in acetone solution was then injected into the cell, lowering water permeability of 0.78 darcies, a 91% reduction in permeability. The plug character was much more solid then that of Example I, completely lacking in elasticity. The plug was very similar to a hard-set cement at the bottom of the cell.

EXAMPLE III

A horizontal metal flow cell was employed in Example III using a very tight sand pack. Clean silica sand, sized in the range of 170 to 230 mesh, was tightly packed into the cell. The preparation steps of Examples I and II were followed to saturate the cell with brine, displace the brine with "Texaco 300 Oil" ® and flood with water to a residual oil saturation of twenty-one percent. Water permeability was 108 millidarcies.

Again, as in Example I, the soluble oil injection was omitted. The 20 percent by weight isobutyl-methacrylate solution in acetone was also employed, reducing water permeability to 57 millidarcies, a reduction of 47% in permeabilty. Examination of the plug revealed a spongy granular network with some consolidation on the flow cell screens. It was evident that the high residual oil saturation of 21 percent was simply too great for an effective precipitant to be formed with the isobutyl-methacrylate. Optimum combination of the methacrylate and water was prevented by the residual oil saturation.

EXAMPLE IV

The cell was set up as in Example III with a residual oil saturation of about 17 percent and a water permeability of 440 millidarcies measured after the water flood. The "Texaco Soluble Oil D" ® flood reduced the water permeability to 90 millidarcies.

After treatment with the 20 percent isobutyl-methacrylate in acetone solution, water permeability was reduced even further to 20 millidarcies, a 95% reduction in permeability with the practice of the invention. Examination of the plug revealed an extremely hard, cemented plug of some 2½ centimeters in thickness. The granular character which was observed in Example III was totally absent in the plug of Example IV.

Various embodiments and modifications in this invention have been disclosed in the foregoing description and examples, and further modifications will be apparent to those skilled in the art. Such modifications are included within the scope of this invention as defined by the following claims.

We claim:

1. A method for selectively reducing the permeability of water-producing zones in a subterranean hydrocarbon formation penetrated by a well in fluid communication with at least one water-producing zone and at least one oil-producing zone, comprising the steps of:
   (a) injecting a soluble oil into the formation.
   (b) injecting water into the formation to drive the soluble oil away from the well and lower the residual oil saturation around the well;
   (c) producing the well for a time sufficient to remove water which invaded any oil zones of the formation;
   (d) displacing any fluids which have collected in the well;
   (e) injecting a treating solution of isobutyl-methacrylate in acetone into the formation;
   (f) injecting a non-condensable gas to drive the treating solution into the formation; and
   (g) shutting-in the well for about 6 to 24 hours.

2. The method of claim 1 wherein a non-condensable gas is also injected into the formation after water is injected to drive the soluble oil away from the well.

3. The method of claim 1 or 2 wherein the injected non-condensable gas is selected from the group consisting of nitrogen, helium, carbon dioxide and methane.

4. The method of claim 1 wherein the well is produced to remove water which invaded any oil zones until the water-oil production ratio is approximately equal to the ratio prior to beginning the method.

5. The method of claim 1 wherein the water injected is formation water.

6. The method of claim 1 wherein water is injected after the soluble oil to lower the residual oil saturation around the well to about 2% to 10%.

7. The method of claim 1 wherein crude oil is injected after the non-condensable gas which follows the treating solution to drive the treating solution further into the formation away from the well.

8. The method of claim 1 wherein the soluble oil is comprised of about 60% to about 90% by weight of a liquid hydrocarbon having dissolved within about 1% to about 30% by weight of an oil soluble surfactant which promotes the formation of an emulsion upon contact with water.

9. The method of claim 8 wherein the soluble oil further comprises about 1% to about 10% sodium rosinate by weight.

10. The method of claim 1 wherein the treating solution is a solution of about 5% to about 30% by weight isobutyl methacrylate in acetone.

11. A method for selectively reducing the permeability of water producing zones in a subterranean hydrocarbon formation penetrated by a well in fluid communication with at least one water-producing zone and at least one oil-producing zone, comprising the steps of:
  (a) injecting a soluble oil into the formation;
  (b) injecting formation water to drive the soluble oil away from the well and lower the residual oil saturation to about 2% to about 5%;
  (c) injecting nitrogen gas into the formation to drive the soluble oil and connate water farther into the formation away from the well;
  (d) producing the well for a time sufficient to remove water which invaded any oil zones of the formation;
  (e) displacing any fluids which have collected into the well;
  (f) injecting a treating solution of about 15% to 25% by weight isobutyl-methacrylate in acetone into the formation;
  (g) injecting nitrogen gas into the formation to drive the treating solution farther into the formation away from the well; and
  (h) shutting-in the well for about 12 to about 24 hours.

* * * * *